Figure 1:
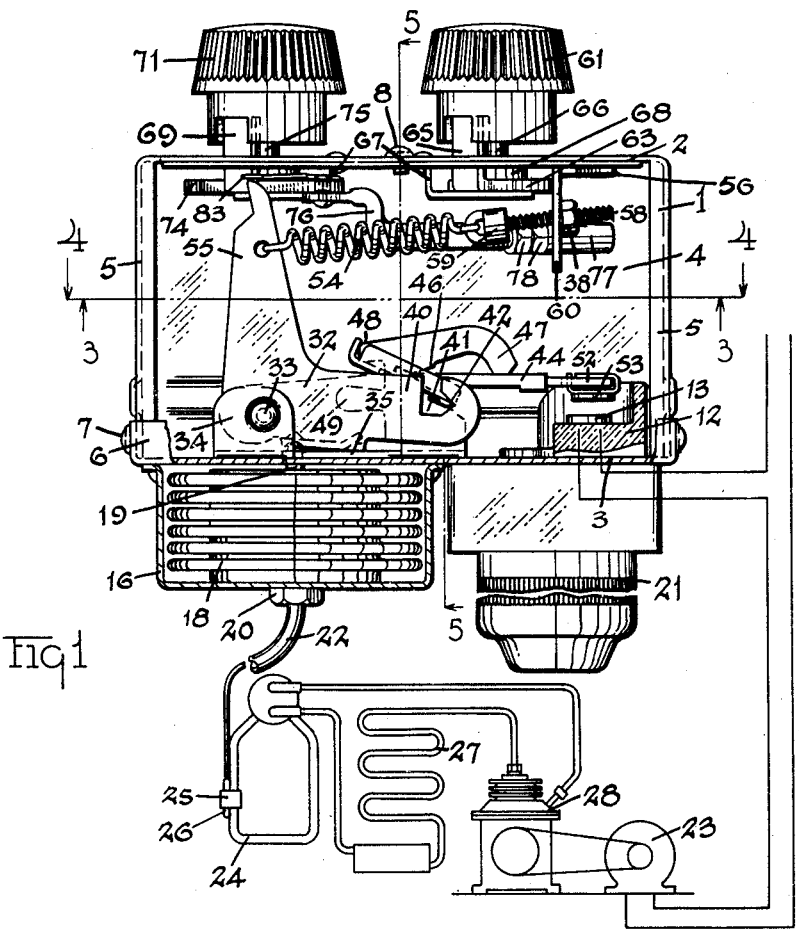

Dec. 27, 1938.  E. D. RANEY  2,141,825

THERMORESPONSIVE CONTROL SWITCH

Filed Oct. 22, 1934  2 Sheets-Sheet 1

Inventor
Eldon D. Raney
By Hanet F. Crampton
Attorney

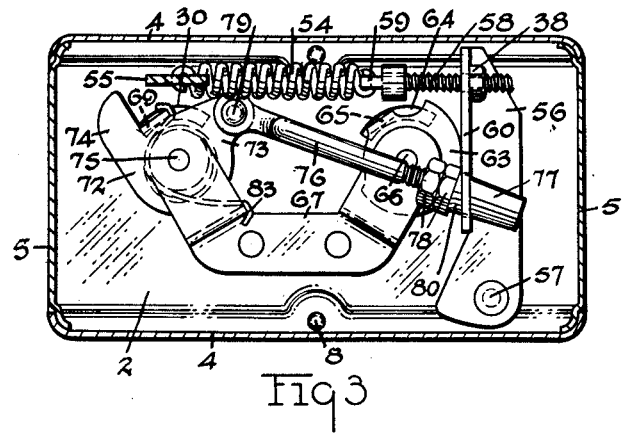
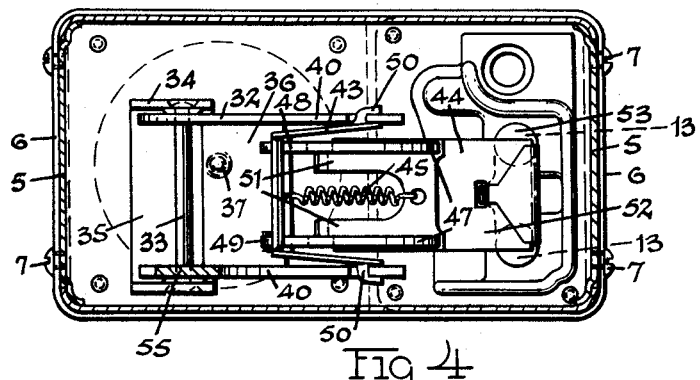
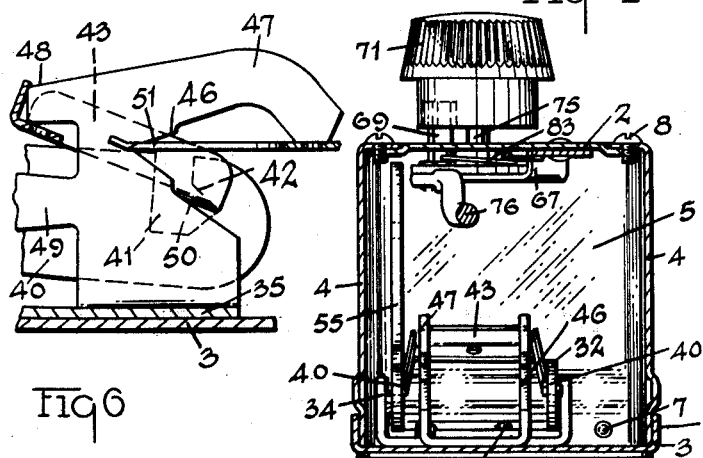

Patented Dec. 27, 1938

2,141,825

UNITED STATES PATENT OFFICE 2,141,825

THERMORESPONSIVE CONTROL SWITCH

Eldon D. Raney, Columbus, Ohio, assignor to Ranco Incorporated, a corporation of Ohio Application October 22, 1934, Serial No. 749,372

35 Claims. (Cl. 200—83)

My invention relates to a thermo-responsive electric switch having means for adjusting the switch to vary the temperatures at which it normally operates and a means for causing the switch to operate at a temperature that is markedly different from the temperatures at which the switch normally operates in response to the adjusting means. The circuit controlled by the thermo-responsive switch may be that of a heat exchange apparatus that produces desired temperatures in response to the adjusted or modified operations of the switch. Thus, the invention may be used for controlling the operations of the refrigerator to produce the desired normal refrigerating temperatures and also, for example, to produce a substantially higher temperature than the normal refrigerating temperatures for defrosting the cooling unit of the refrigerator.

The invention provides a thermic switch having a manually adjustable means for adjusting within a fixed range the switch opening and closing temperatures to produce normal operations of a refrigerator and a second manually operable means for causing the switch to operate at a predetermined extreme temperature in the refrigerator other than the temperatures produced by the adjustments of the manually adjustable means.

The invention particularly relates to thermoresponsive switches for the control of electric refrigerating apparatus wherein means is provided for adjustably varying the operations of the switch to produce adjustable normal refrigerating temperatures and wherein a second means is provided for modifying the operation of the switch to produce an automatically terminated defrosting period in the refrigerator, during which period the temperature of the cooling unit of the refrigerator is permitted to rise to a predetermined point substantially above the freezing point of water before refrigerating temperatures are again produced in the cooling unit.

It is the particular object of my invention to provide a thermo-responsive switch of the general type described above, in which the variation of the tension of a single spring that counteracts the expansion of a thermo-responsive element of the thermic switch produces not only desired adjustable temperatures, but also produces a predetermined defrosting temperature notwithstanding adjustment of the normal refrigerating temperatures.

It is a further object of my invention to provide means for automatically restoring the operation of the switch to produce the manually adjusted normal refrigerating temperatures upon attainment of the predetermined defrosting temperature.

The invention may be contained in temperature control devices of different forms, and to illustrate a practical application of the invention, I have selected a refrigerator control switch as an example of the various embodiments of the invention, it being understood that variations may be made in the details of construction without departing from the spirit of the invention as claimed in the claims. The control switch selected as an example of the structures containing my invention is shown in the accompanying drawings and described hereinafter.

Figure 2:
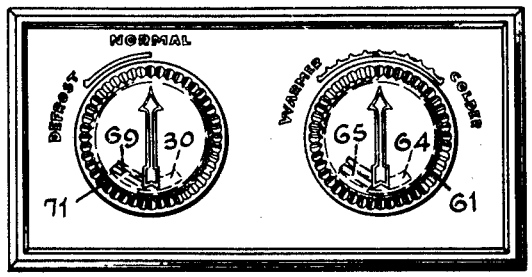

Fig. 1 is a view of a section of the switch and also illustrates diagrammatically a refrigerating apparatus controlled by the switch. Fig. 2 is a top view of the switch-enclosing shell and illustrates the manually operable members for modifying the responsiveness of the switch to the temperatures produced in the refrigerator. Fig. 3 is a view of a section of the control device taken on the plane of the section line shown in Fig. 1 when viewed in the direction of the arrows 3—3. Fig. 4 is a view of the section of the control device shown in Fig. 1 when viewed in the direction of the arrows 4—4. Fig. 5 is a view of a section taken on the plane of the line 5—5 as indicated in Fig. 1. Fig. 6 is a view of a means for pivotally supporting the movable switch arm.

The main operative elements of the control switch are enclosed in a metal shell 1 having suitable insulating parts for electrically insulating the circuit carrying parts that are located within the shell. The shell 1 comprises a supporting plate 2, a base 3, and sides 4. The plate 2 has end parts 5 that are bent at right angles to the body of the plate to form the ends of the shell. The edges of the plate 2 and its end parts 5 are formed to have inset edge portions for receiving the sheet metal sides 4, the edges of which are flanged and correspondingly inset so that the edges of the side 4 where they contact with the supporting plate 2 and its end parts 5 will be substantially flush with the surfaces of the plate 2 and its end parts when the sides 4 are slid into place.

The base 3 is provided with a suitable marginal flange 6. The base 3 is secured to the end parts 5 of the plate 2 by means of the screws 7.

The sides 4 are slidably insertable between the edges of the end parts 5 and the flange 6 of the base and secured in nesting relation with the inset edges of the supporting plate 2 and its end parts 5 by means of the screws 8. The switch thus may be readily assembled, since the switch actuating elements and contacts may be located on the base part, and the manual control elements for varying the responsiveness of the switch may be mounted on the supporting plate; the base part may be secured to the supporting plate, and the elements mounted on the base interconnected with the elements mounted on the supporting plate.

An insulating block 12 having embedded therein the terminals that extend from the contacts 13 is located at one end of the base 3. The block 12 extends through an opening formed in the base and is secured in place by suitable screws. The terminals project outwardly from the block 12 and are readily connected to the refrigerator motor circuit by means of a suitable plug 21.

The thermic element, which includes a bellows 18 and a connecting tube 22 having a bulb 26 on its end, is secured in position on the base by means of a cap 16 that encloses the bellows. The bellows 18 is secured in the cap 16 by means of the nut 20, and the cap may be secured to the base by suitable screws. A pin 19 is located on one end of the bellows and extends through the base 3 to operatively connect the bellows with the switch. The thermic element may be readily connected with the cooling unit 24 by means of a suitable heat conductive clamp 25 that clamps the bulb 26 to the unit 24. The bellows, tube, and bulb are filled with a fluid that thermically responds by pressure changes to the temperatures produced in the bulb 26, which vary quite in accordance with the temperatures produced in the cooling unit, to produce corresponding expansion of the bellows.

The switch mechanism is operated by the expansion and contraction of the bellows 18. A relatively wide switch actuating member 32 is pivotally supported by a spindle 33 extending transverse the member and through the lugs 34 that may project from a supporting plate 35 spot-welded to the base part 3. The actuating member 32 is provided with a cross part 36 suitably detented at 37 to receive the point of the pin 19 which extends through the base 3 and engages the switch actuating member 32 at a point in proximity to the axis of oscillation of the member so that a slight expansion or contraction of the bellows 18 will rock the member through a relatively large angle.

The switch actuating member 32 is provided with a pair of laterally extending arms 40 that are formed integral with the cross part 36 and between which are located the members of a toggle switch. The arms 40 have slots 41 formed in the ends thereof. The slots have portions of their edges inclined to each other to form V-bearings or slots as shown at 42. The central axis of each of the V-slots extends substantially in the direction that the arms 40 extend from the spindle 33. The V-slots form bearing centers for a relatively broad U-shaped sheet metal link 43. The link 43 is provided with laterally extending bevel edged lugs 50 which engage in the V-bearings 42. The link 43 lies between the arms 40 and extends from the said bearings in a general direction toward the spindle 33 of the switch actuating member. The U-shaped link is connected at the center of the cross part to a switch arm 44 by means of a spring 45. The switch arm 44 is also relatively broad and is bifurcated at one end to form a pair of legs 51. The ends of the legs 51 of the switch arm are located in V-shaped slots 46 formed at the base of two pairs of laterally extending fingers 47 and 48 that are supported on the plate 35. The bifurcated end of the switch arm 44 lies within the U-shaped link 43 and is pivoted to the supporting plate 35 in proximity to the cross part of the U-shaped member. The other end part of the switch arm is formed of a strip of insulating material 52, such as stiff fiber, and carries a contact bar 53 adapted to bridge the contacts 13. The spring 45 is connected to the switch arm and the U-shaped link to locate the spring within the bifurcated end of the switch arm and the U-shaped link and operates to draw the ends of the U-shaped link and the bifurcated end of the switch arm against their respective V-shaped bearings.

The switch arm is limited in its oscillatory movements between the ends of the laterally extending fingers 47 formed on the plate 35 and the contacts 13, while the U-shaped link is limited in its pivotal movements between the fingers 48 and the lug 49 also formed on the plate 35.

In the operation of the switch, the bellows rocks the switch actuating member 32 about the spindle 33, raising and lowering the arms 40. As the arms 40 are raised, the pivot points of the U-shaped link 43 are raised above the center line of the spring 45, whereupon the tension of the spring snaps the U-shaped link 43 downward, which in turn causes the switch arm 44 also to snap downward and thereby bridge the contacts 13 by the contact bar 53 carried by the switch arm 44 and close the circuit of the motor 23.

The motor 23 operates the compressor 28 which compresses the refrigerant gas and forces it into the condenser 27. The condensed refrigerant is drawn into the cooling unit 24, producing refrigeration in the well known manner. As the fluid in the bulb 26 is cooled, the pressure decreases, and the bellows 18 contracts, permitting the switch actuating member 32 to rotate clockwise, as viewed in Fig. 1, allowing the arms 40 to descend. As the arms 40 descend, the pivot points of the link 43 drop below the center line of the spring, causing the end of the link to be thrown upward, thereby snapping the switch arm away from the contacts 13.

The opening and closing temperatures of the switch are controlled by varying the load that is placed on the bellows. In the form of construction shown, a tension spring 54 is connected to the arm 55 formed on the switch actuating member 32 and to an adjusting lever 56. The lever 56 is connected to the supporting plate 2 by a pivot pin 57. The tension of the spring 54 on the arm 55 is varied by movement of the lever 56 about its axis. Increasing the spring tension increases the pressure required within the bellows to produce a fixed volumetric expansion of the bellows for opening and closing the switch, and consequently raises the switch operating temperature. Similarly, a decreased tension reduces the internal pressure of the bellows and lowers the temperature required to operate the switch.

The spring 54 is connected to the lever 56 by means of a screw 58 having an eyelet 59 through which the end of the spring is hooked. The screw extends through an opening in a depending flange 60 formed on the lever 56 and is provided with a nut 38 for engaging the flange. Factory adjustment of the control device may be produced by adjusting the nut 38 on the screw 58. This adjustment is usually made when the device is calibrated.

The adjusting lever 56 is moved about its pivot by manually operated control elements located on the supporting plate 2. The manually adjustable control means comprises a cam 63 that is engaged by the lever 56 and when rotated, moves the lever 56 about its axis within certain limits so as to vary the tension of the spring 54, producing thereby limited temperature adjustments. The lever 56 is normally held against the periphery of the cam 63 by the tension of the spring 54.

The rotation of the cam 63 is limited by means of a slot 64 formed in the supporting plate 2 through which a lug 65 that is struck up from the cam 63 extends. The cam 63 is mounted on a shaft 66 which rotates in bearings formed in the supporting plate and a two-armed bracket member 67. Preferably, the cam is located intermediate the bracket member 67 and the supporting plate 2.

The cam 63 is rotated by a knob 61 located on the outside of the shell and pin-keyed to the shaft 66. The knob has a recess into which the lug 65 of the cam 63 extends. The knob is limited in its adjustment of the spring 54, and consequently the normal switch operating temperature, by the lug 65 and the length of the slot 64. The contour of the cam 63 may be varied to give particular temperature range adjusting characteristics as may be desired by the designer of the refrigerating apparatus. A spring washer 68 is located intermediate the cam 63 and the supporting plate 2 and produces frictional resistance to rotation of the cam 63 and knob 61 to maintain the manual adjustment at which the knob is set.

The position of the lever 56 may also be modified by the operation of a second control member to increase the tension of the spring 54 beyond that obtainable by the rotation of the cam 63 by the knob 61. The second control member has a knob 71 rotatably connected to a disc 72 having arms 73 and 74. The knob 71 is connected to the disc 72 by a lug 69 struck up from the disc and located in a recess formed in the knob. The lug 69 extends through an arcuate slot 30 formed in the supporting plate 2 and operates to limit the movement of the disc 72.

The arm 73 is pivotally connected to a link 76 by means of a pin 79. The disc 72 is rotatably supported on a shaft 75 between the double bracket member 67 and the supporting plate 2. The shaft 75 is located in a bearing in the bracket member 67 and extends through the supporting plate 2. The knob 71 may be connected to the shaft 75 by means of a suitable screw.

A sleeve 77 is threaded on the end of the link 76 and adjustably secured in place by suitable lock nuts 78. The sleeve extends through an opening formed in the depending flange 60 located on the lever 56 and is provided with a rounded shoulder 80 which engages the edges of the opening to form a swivel joint between the link 76 and the lever 56 when the lever is engaged by the shoulder. The sleeve 77 is normally so disposed as to position the shoulder 80 at a point removed from the edges of the opening through which the sleeve extends and thus permits free movement of the lever 56 by the cam 63. A torsion spring 83 is connected to an arm of the double bracket 67 and to the lug 69 and yieldingly maintains the shoulder 80 removed from the lever 56 and the lug 69 against one end of the slot 30. When the knob 71 is turned counter-clockwise, (as viewed in Fig. 2) the arm 73 and the link 76 operate toggle-wise to move the lever 56 away from the cam 63 and produce a definite, predetermined increase tension in the spring 54 to cause an increased load on the bellows and prevent closing of the switch until the temperature of the chilling unit of the refrigerator has risen to a defrosting temperature. The spring 54 acts to force the lug 69 against one end of the slot 30, which maintains the toggle in its extended position and thus maintains the increased tension of the spring that produces defrosting.

The defrosting operation is automatically terminated by the expansion of the bellows, which releases or breaks the toggle. The lever 56 then re-engages the cam 643 when the predetermined maximum temperature of the defrosting period is produced in the refrigerator. As the lever arm 55 is moved to the left as viewed in Fig. 1 by the expansion of the bellows 18 during the defrosting period, it engages the arm 74 and eventually moves the pivot pin 79 across the line extending between the center of rotation of the disc 72 and the point of engagement of the shoulder 80 with the lever 56, and the spring 54 snaps the lever 56 against the cam 63. The torsion spring 83 operates to return the disc 72 and the knob 71 to their normal positions and to withdraw the shoulder 80 from the edge of the opening in the flange 60 of the lever 56.

The defrosting temperature may be adjusted to a predetermined point by adjusting the sleeve 77 relative to the link 76, so that when the disc 72 is rotated to produce defrosting, the tension of the spring 54 will be varied according to the adjustment of the sleeve 77.

Since the lever 56 is completely disconnected from the edge of the cam 63 when the switch is set for defrosting, and the link 76 moves the lever 56 a certain, unvarying distance at each operation, the defrosting temperature will be constant regardless of the adjustment of the normal switch operating temperatures.

I claim:

1. In a refrigerator control switch, a thermoresponsive element for operating the switch in response to temperatures produced in the refrigerator, a resilient member for loading the thermo-responsive element, means for adjusting within limits the tension of the resilient member to produce desired normal refrigerating temperatures in the refrigerator, means for establishing a predetermined tension in the resilient member irrespective of the adjustment of the adjusting means to increase the switch closing temperatures of the switch above the switch closing temperatures as determined by the adjustment of the first named means, and means responsive to a subsequent operation of the element for automatically restoring the tension of the resilient means to that produced by the first named means.

2. In a temperature responsive switch, a switch member, a pressure responsive element for operating the switch member, a spring operable to yieldingly resist movements of the switch member, adjusting means including a cam member for controlling the tension of the spring within fixed limits, and means for nullifying the control of the adjusting means and for temporarily increasing the tension of the spring beyond the said fixed limits.

3. In a refrigerator control switch, a temperature responsive means for operating the switch in response to temperatures produced in the refrigerator, a spring for opposing the switch closing movement by the temperature responsive means, a member for varying the tension of the spring for adjusting the switch opening and closing temperatures to produce normal refrigerating temperatures, and a second member for nullifying the control of the adjusting member and for increasing the tension of the spring to a predetermined value for temporarily increasing the switch closing temperature to a predetermined degree above the normal switch closing temperatures.

4. In a temperature responsive switch, a switch member, a pressure responsive element for operating the switch member, a spring operable to yieldingly resist movements of the switch member, a control member for controlling the tension of the spring within fixed limits, and a second controlling member for nullifying the control of the first control member and for increasing the tension of the spring beyond the said fixed limits producible by the first member, and means for automatically restoring tension in the spring from the control of the second member to that of the first member.

5. In a refrigerator control switch, a pressure responsive means for operating the switch in response to temperatures produced in the refrigerator, a spring for opposing the switch closing movement of the pressure responsive means, a spring connecting element, and a member having means for connecting the member to the element for varying the tension of the spring for adjusting the switch opening and closing temperatures, and a second member having means for connecting the second member to the element and disconnecting the said first named member from the element and for increasing the tension of the spring to a predetermined degree for temporarily increasing the switch closing temperature to a predetermined temperature above that producible by the first named member, and means for automatically restoring the connection of the first named member with the element upon closure of the switch at the said predetermined switch closing temperature.

6. In a refrigerator control switch, a thermo-responsive element for operating the switch in response to temperatures produced in the refrigerator, a resilient member for resisting the expansive movement of the thermo-responsive element, a cam, means for connecting the cam to the said resilient member for varying within a limit the tension of the resilient member, and means for operably disconnecting the resilient member from the cam and producing an increased tension of the resilient member beyond that producible by the operation of the cam.

7. In a refrigerator control, a thermo-responsive element for operating the switch in response to temperatures produced in the refrigerator, a spring for resisting the expansive movements of the thermo-responsive element, a lever connected to the said spring, a cam for operating the said lever to vary within limits the tension of the spring, and means for moving the lever from the cam for producing a predetermined tension in the spring different from that producible by the operation of the cam.

8. In a refrigerator control switch, a thermo-responsive element for operating the switch in response to the temperatures produced in the refrigerator, a spring for resisting the expansive movements of the thermo-responsive element, a lever connected to the said spring, a cam for operating the said lever to vary within limits the tension of the spring, a toggle joint for removing the lever from the cam to produce a tension in the spring greater than that producible by the cam, and means operable by the thermo-responsive element for breaking the toggle to cause the return of the lever to its operative relation with the cam.

9. In a refrigerator control switch, a thermo-responsive element for operating the switch, a tension element for controlling the switch opening and closing movements by the thermo-responsive element to produce refrigerating temperature cycles, adjusting means for adjusting the tension of the tension element for producing normal operating cycles between desired normal fixed temperature limits, a second means nullifying the adjusting function of the adjusting means and for varying the tension of the tension element to produce a definite fixed temperature limit, and means for automatically restoring the tension of the tension element to the tension produced by the first named means upon the production of the temperature limit producible by the said second means.

10. In a refrigerating control switch, a thermo-responsive element for operating the switch, a tension element for controlling the switch opening and closing movements by the thermo-responsive element to produce refrigerating temperature cycles, a cam means for varying the tension of the said tension element to produce temperature cycles between desired fixed limits, a second means for producing a tension in the tension element other than the tension produced by the said cam means, and automatic means for restoring the tension of the tension element to the tension produced by the first named means upon the completion of the operating cycle produced by the operation of the said second means.

11. In a pressure operated switch, a pressure responsive device for operating the switch, a resilient member for controlling the pressures at which the switch is operated by the pressure responsive device, means for varying the adjustment of the resilient member, a trip means operative for rendering the adjusting means ineffective to vary the adjustment of the resilient member and to modify the effective pressure of the resilient member on the pressure responsive device to modify the pressure at which the switch is operated, and means operated by the pressure responsive device for tripping said trip means to restore the operation of the switch to the pressures determined by the adjustment of the first named means.

12. In a pressure responsive switch, a pressure responsive device for operating the switch, a resilient member for controlling the pressures at which the switch is operated, means for adjusting the tension of the resilient member to vary the pressures at which the switch is operated, means including a trip device for rendering the adjusting means ineffective to adjust the tension of the resilient member and for modifying the tension of said resilient member to produce modified switch operating pressure, and means for automatically tripping said trip device to restore operation of the switch to the pressures determined by adjustment of the first named means.

13. In a temperature responsive switch structure, a base having turned edges, a switch mounted on said base, a temperature responsive device mounted on said base and operative to open and close the switch, a frame part having supporting parts at each end thereof, an adjusting means located on said frame, means for connecting the turned edges of the base with the supporting parts of the frame, and a tension spring interconnecting said switch with said adjusting means and adjusted by the said adjusting means for controlling the temperature at which the switch is operated.

14. In a pressure responsive switch, a shell including a pair of oppositely disposed wall parts, a switch and a switch-operating pressure responsive device supported on one wall part, a spring for controlling the pressures at which the switch is operated, and means located on the other wall part for adjusting the said spring, a pair of removable side walls, one of the wall parts having flanges for securing the side walls in position relative to the wall parts.

15. A shell for containing an adjustable switch mechanism, the shell having a frame forming three outer walls of the shell and comprising two end walls and a side wall, a fourth wall connected to the ends of the end walls, a switch control mechanism supported on the said side wall, a switch mechanism supported on the said fourth wall and having an arm extending cross-wise the space between the walls and connected to the switch control mechanism, side plates having edge parts that contact with the edge parts of the said outer walls for closing the opposite sides of the shell.

16. A shell for containing an adjustable switch mechanism, the shell having a frame forming three outer walls of the shell and comprising two end walls and a side wall, a fourth wall connected to the ends of the end walls, a switch mechanism supported on the said fourth wall, a switch control mechanism supported on the said side wall, an element for connecting the control mechanism to the switch mechanism.

17. A shell for containing an adjustable switch mechanism, the shell having a frame forming three outer walls of the shell and comprising two end walls and a side wall, a fourth wall connected to the ends of the end walls, a switch mechanism supported on the said fourth wall, a switch control mechanism supported on the said side wall, an element for connecting the control mechanism to the switch mechanism, side plates for closing the opposite sides of the shell, the said fourth wall and the end walls having flange parts for slidably connecting the side plates to the frame.

18. A shell for containing an adjustable switch mechanism, the shell having a frame forming three outer walls of the shell and comprising two end walls and a side wall, a fourth wall connected to the ends of the end walls, a switch control mechanism extending along and supported on the said side wall, a switch and switch-operating elements extending along and supported on the said fourth wall, the switch-operating elements having an arm extending in a direction cross-wise the said walls for connecting the switch control mechanism with the switch-operating elements.

19. A shell for containing an adjustable pressure-operated switch mechanism, a shell having a frame forming three outer walls of the shell and comprising two end walls and a side wall, a fourth outer wall connected to the ends of the end wall, a switch and switch terminals and a switch-operating mechanism supported on the said fourth wall, a connector for connecting the switch terminals, and a pressure means for operating the switch mechanism supported on the said fourth wall, side plates having edge parts that contact with the edge parts of the said outer walls for closing the opposite sides of the shell.

20. A shell for containing an adjustable pressure operated switch mechanism, a shell having a frame forming three outer walls of the shell and integrally connected and comprising two end walls and a side wall, a fourth outer wall removably connected to the ends of the end walls, a switch control mechanism supported on the said side wall, a switch and switch terminals and a switch operating mechanism supported on the said fourth wall, a connector for connecting the switch terminals to an electric circuit and a pressure means for operating the switch mechanism supported on the said fourth wall, an element for connecting the switch control mechanism to the said switch mechanism and extending substantially across the space between the said side wall and the said fourth wall, side plates having edge parts that engage with the edge parts of the said outer walls for closing the opposite sides of the shell.

21. In a switch, in combination, a movable actuating member, means yieldingly affecting movement of said member, adjustable means for varying the effect of said yielding means between predetermined limits, a device for nullifying the effect of the control of the adjustable means on the yielding means and for imposing a predetermined adjustment upon said actuating member, and means for rendering said device operative and inoperative.

22. In a switch, in combination, a movable actuating member, means yieldingly affecting movement of said member, adjustable means for varying the effect of said yielding means between predetermined limits, a device for nullifying the control of the adjustable means on the yielding means and for imposing a predetermined adjustment upon said actuating member, means for rendering the device operative, and means for relieving the device of its control and for restoring the effective control of said actuating member to said first and second means.

23. In a switch, in combination, a movable actuating member, means yieldingly affecting movement of said member, adjustable means for varying the effect of said yielding means between predetermined limits, a device for nullifying the control of the adjustable means on the yielding means and for imposing a predetermined adjustment upon said actuating member, means for rendering the device operative, and means operated by subsequent operation of said actuating member for relieving the device of its control and for restoring the effective control of said actuating member to the first and second mentioned means.

24. In a switch, in combination, an actuating member, means for yieldingly affecting movement of said member, adjustable means for varying the effect of said yielding means between predetermined limits, and a device for nullifying the control of the adjustable means on the yielding means and for imposing a predetermined adjustment upon said yielding means, and means for rendering the device operative and inoperative.

25. In a switch, in combination, an actuating member, means for yieldingly affecting movement of said member, adjustable means for varying the effect of said yielding means, between predetermined limits, a device for nullifying the control of the adjustable means on the yielding means and for imposing a predetermined adjustment upon said yielding means, means for rendering the device operative, and means for relieving the device of its control and for restoring the effective control to the adjustment means.

26. In a switch, in combination, an actuating member, means for yieldingly affecting movement of said member, adjustable means for varying the effect of said yielding means between predetermined limits, a device for nullifying the control of the adjustment means on the yielding means and for imposing a predetermined adjustment upon said yielding means, means for rendering the device operative, and means operated by a subsequent operation of said actuating member for relieving the device of its control and for restoring the effective control to the adjustable means.

27. In a switch, in combination, an actuating member, means for yieldingly affecting movement of said member, adjustable means for varying the effect of said yielding means between predetermined limits, and a manually controlled device for nullifying the control of the adjustable means on the yielding means and for imposing a predetermined adjustment upon said yielding means.

28. In a switch, in combination, a movable actuating member, means for yieldingly affecting movement of said member, adjustable means for varying the effect of said yielding means between predetermined limits, a device for imposing a predetermined adjustment upon said yielding means and for supplanting the control of the adjustable means upon said yielding means, and means for rendering the device operative and nonoperative.

29. In a switch, in combination, a movable actuating member, means for yieldingly affecting the movement of said member, adjustable means for varying the effect of said yielding means between predetermined limits, a device for imposing a predetermined adjustment upon said yielding means and for supplanting the control of the adjustable means, means for rendering the device operative, and means for relieving the device of its control and restoring the effective control to the yielding means by the adjustable means.

30. In a switch, in combination, a movable actuating member, means for yieldingly affecting the movement of said member, adjustable means for varying the effect of said yielding means between predetermined limits, a device for imposing a predetermined adjustment upon said yielding means and for supplanting the control of the adjustable means, means for rendering the device operative and means operated by a subsequent operation of said actuating member for relieving the device of its control and restoring the effective control of the yielding means to the adjustable means.

31. In a pressure responsive switch, a spring for controlling the pressure at which the switch is operated, means for adjusting the tension of the spring within fixed limits, means operative to establish a predetermined tension in the spring and for nullifying the effect of the adjusting means on the spring, and means for yieldingly maintaining the second mentioned means in operative condition by the tension of the spring.

32. In a switch, in combination, a movable actuating member, a spring affecting movement of said member, adjustable means for varying the effect of said spring between predetermined limits, an overthrow toggle mechanism adapted to be moved from a non-associated position with respect to said spring to a position in which it is associated with said spring and, when so associated, directly biased thereby in one direction, and means for moving the toggle mechanism from the non-associated position to the associated position.

33. In a switch, in combination, a movable actuating member; means yieldingly affecting movement of said member; adjustable means for varying the effect of said yielding means between predetermined limits; an overthrow toggle mechanism adapted to be associated with said yielding means, and when so associated, biased thereby in one direction; and means for associating the toggle mechanism with the yielding means and for simultaneously nullifying the effect of the adjustable means.

34. In a switch, in combination, a movable actuating member, a spring affecting movement of said member, adjustable means for varying the effect of said spring between predetermined limits, an overthrow toggle mechanism adapted to be moved to a position to yieldingly affect the movement of the actuating means and from a non-associated position with respect to said spring to a position in which it is associated with the spring and, when so moved, directly biased in one direction by the spring; and means for moving said overthrow toggle mechanism into said affecting position.

35. In a switch, in combination, a movable actuating member; means yieldingly affecting movement of said member; adjustable means for varying the effect of said yielding means between predetermined limits; an overthrow toggle mechanism adapted to be moved to a position to yieldingly affect the movement of the actuating means and adapted to be associated with the yielding means and, when so moved, biased in one direction by the yielding means; and means for moving said overthrow toggle mechanism into said affecting position and for simultaneously nullifying the effect of the adjustable means.

ELDON D. RANEY.